United States Patent
Huo et al.

(10) Patent No.: US 12,360,506 B2
(45) Date of Patent: Jul. 15, 2025

(54) METHOD AND APPARATUS FOR OPTIMIZING SYSTEM ENERGY EFFICIENCY BASED ON AN INTEGRATED ENERGY REQUIREMENT, ELECTRONIC DEVICE, AND STORAGE MEDIUM

(71) Applicants: ELECTRIC POWER SCIENCE & RESEARCH INSTITUTE OF STATE GRID TIANJIN ELECTRIC POWER COMPANY, Binhai New Area (CN); STATE GRID TIANJIN ELECTRIC POWER COMPANY, Hebei District (CN); STATE GRID CORPORATION OF CHINA, Beijing (CN)

(72) Inventors: Xianxu Huo, Binhai New Area (CN); Jiancheng Yu, Binhai New Area (CN); Chao Pang, Binhai New Area (CN); Tao Liu, Binhai New Area (CN); Yi Ding, Binhai New Area (CN); Shiqian Ma, Binhai New Area (CN); Jian Zhang, Binhai New Area (CN); Chenyang Zhao, Binhai New Area (CN); Zhishuang Wang, Binhai New Area (CN)

(73) Assignees: ELECTRIC POWER SCIENCE & RESEARCH INSTITUTE OF STATE GRID TIANJIN ELECTRIC POWER COMPANY, Binhai New Area (CN); STATE GRID TIANJIN ELECTRIC POWER COMPANY, Hebei District (CN); STATE GRID CORPORATION OF CHINA, Beijing (CN)

(*) Notice: Subject to any disclaimer, the term of this patent is extended or adjusted under 35 U.S.C. 154(b) by 0 days.

(21) Appl. No.: 18/919,212

(22) Filed: Oct. 17, 2024

(65) Prior Publication Data

US 2025/0172917 A1 May 29, 2025

Related U.S. Application Data

(63) Continuation of application No. PCT/CN2024/108358, filed on Jul. 30, 2024.

(30) Foreign Application Priority Data

Nov. 24, 2023 (CN) .......................... 202311575306

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS

| 7,991,512 B2 * | 8/2011 | Chandra | G06Q 30/0202 700/297 |
| 10,719,636 B1 * | 7/2020 | Hoff | G06Q 10/0631 |

(Continued)

FOREIGN PATENT DOCUMENTS

| CN | 110705776 A | 1/2020 |
| CN | 110705863 A | 1/2020 |

(Continued)

OTHER PUBLICATIONS

1st Chinese Office Action for Chinese Application No. 202311575306. 5, dated Jan. 5, 2024 (Jan. 5, 2024)—3 pages (English translation—4 pages).

*Primary Examiner* — Jason Lin
(74) *Attorney, Agent, or Firm* — CM Law; Stephen J. Weed

(57) ABSTRACT

Provided are a method for optimizing system energy efficiency and apparatus based on an integrated energy requirement, an electronic device, and a storage medium. The method includes, in response to a received target integrated (Continued)

energy requirement, constructing the energy efficiency optimization function of a target system according to an integrated energy requirement parameter, the operating parameter of the target system, and the environment loss parameter of the target system; constructing a constraint condition for optimizing the energy efficiency of the target system based on the balance relationship between energy supply and energy consumption and a device operating requirement for transmitting energy; and based on the energy efficiency optimization function and the constraint condition, using a target algorithm, using operating parameters of multiple devices in the target system as population individuals.

11 Claims, 7 Drawing Sheets

(56) References Cited

U.S. PATENT DOCUMENTS

| | | | | |
|---|---|---|---|---|
| 11,537,957 B2* | 12/2022 | Padullaparthi | .......... | H02J 3/381 |
| 2005/0055137 A1* | 3/2005 | Andren | .................. | G06Q 30/02 |
| | | | | 700/291 |
| 2009/0302681 A1* | 12/2009 | Yamada | .................... | H02J 7/35 |
| | | | | 700/286 |
| 2010/0188413 A1* | 7/2010 | Hao | ....................... | G06T 11/001 |
| | | | | 345/589 |
| 2010/0211222 A1* | 8/2010 | Ghosn | .................... | G01K 17/00 |
| | | | | 702/182 |
| 2010/0219983 A1* | 9/2010 | Peleg | ....................... | G01K 13/00 |
| | | | | 340/870.16 |
| 2011/0137763 A1* | 6/2011 | Aguilar | .............. | G06Q 30/0282 |
| | | | | 705/347 |
| 2011/0282602 A1* | 11/2011 | Hoff | ........................ | H02S 10/00 |
| | | | | 702/60 |
| 2011/0295506 A1* | 12/2011 | Hoff | ........................ | G01W 1/12 |
| | | | | 702/3 |
| 2012/0130556 A1* | 5/2012 | Marhoefer | .............. | G05B 15/02 |
| | | | | 700/291 |
| 2012/0158350 A1* | 6/2012 | Steinberg | .................. | F24F 11/47 |
| | | | | 702/130 |
| 2012/0191439 A1* | 7/2012 | Meagher | ................. | G06Q 50/00 |
| | | | | 703/18 |
| 2013/0060471 A1* | 3/2013 | Aschheim | .............. | G01K 17/00 |
| | | | | 702/136 |
| 2014/0129197 A1* | 5/2014 | Sons | ................... | G06Q 30/0206 |
| | | | | 703/7 |
| 2015/0057820 A1* | 2/2015 | Kefayati | ................. | G06Q 50/06 |
| | | | | 700/291 |
| 2015/0269664 A1* | 9/2015 | Davidson | ................ | G06Q 40/00 |
| | | | | 705/35 |
| 2015/0323423 A1* | 11/2015 | Alsaleem | ................. | F24F 11/30 |
| | | | | 62/127 |
| 2016/0187911 A1* | 6/2016 | Carty | ...................... | G05B 15/02 |
| | | | | 700/276 |
| 2016/0306906 A1* | 10/2016 | McBrearty | .............. | H02J 3/381 |
| 2021/0335639 A1 | 10/2021 | Qian et al. | | |
| 2023/0095670 A1* | 3/2023 | Asakura | .................. | B60L 55/00 |
| | | | | 320/109 |

FOREIGN PATENT DOCUMENTS

| | | | | |
|---|---|---|---|---|
| CN | 111668878 A | * | 9/2020 | .............. H02J 3/466 |
| CN | 115375019 A | | 11/2022 | |
| CN | 116306194 A | | 6/2023 | |
| CN | 116739370 A | | 9/2023 | |
| CN | 116960959 A | | 10/2023 | |
| KR | 20220151435 A | | 11/2022 | |
| WO | 2019134532 A1 | | 7/2019 | |
| WO | 2023274425 A1 | | 1/2023 | |

* cited by examiner

200

```
┌─ S210
In response to a received target integrated energy requirement, construct the
energy efficiency optimization function of a target system according to an
integrated energy requirement parameter, the operating parameter of the target
system, and the environment loss parameter of the target system
```

```
┌─ S220
Construct a constraint condition for optimizing the energy efficiency of the
target system based on the balance relationship between energy supply and
energy consumption and a device operating requirement for transmitting energy
```

```
┌─ S230
Based on the energy efficiency optimization function and the constraint
condition, use a target algorithm, use the operating parameters of multiple
devices in the target system as population individuals, and process the operating
parameters of the multiple devices to obtain the device parameter of the target
system that satisfies the target integrated energy requirement
```

FIG. 2

METHOD AND APPARATUS FOR OPTIMIZING SYSTEM ENERGY EFFICIENCY BASED ON AN INTEGRATED ENERGY REQUIREMENT, ELECTRONIC DEVICE, AND STORAGE MEDIUM

CROSS-REFERENCE TO RELATED APPLICATION

This is a continuation of International Patent Application No. PCT/CN2024/108358, filed on Jul. 30, 2024, which is based on and claims priority to Chinese patent application No. 202311575306.5 filed with China National Intellectual Property Administration (CNIPA) on Nov. 24, 2023, the disclosure of which is incorporated herein by reference in its entirety.

TECHNICAL FIELD

The present application relates to the field of energy utilization technology, for example, a method and apparatus for optimizing system energy efficiency based on an integrated energy requirement, an electronic device, and a storage medium.

BACKGROUND

With the development of energy technology, the constraint of conventional electricity requirement response technology is gradually revealed. On the one hand, the time shifting of load not only reduces user comfort to a certain extent, but also affects the output value of a user and user satisfaction and is greatly affected by user willingness. On the other hand, with the accelerated advancement of integrated energy technology and engineering construction, the trend of energy diversification is prominent. The "multi-energy complementarity" feature of an integrated energy system can implement the conversion between electricity and other energy, and the overall external adjustable feature of the overall system is more apparent.

Integrated energy requirement response emerges as the times require. As an extension of traditional electricity requirement response, the integrated energy requirement response not only has the feature of electricity requirement response, but also enables users to significantly expand the range of electrical adjustable load resource libraries when system reliability is threatened or an energy supply method is reformed during the peak period of electricity prices, which serves as a beneficial supplement to traditional electricity requirement management and requirement response technology. Thus, the research on integrated energy requirement response terminals and multi-energy application system response optimization has important theoretical and practical value.

SUMMARY

The present application provides a method and apparatus for optimizing system energy efficiency based on an integrated energy requirement, an electronic device, and a storage medium.

According to a first aspect of the present application, a method for optimizing system energy efficiency based on an integrated energy requirement is provided. The method includes the following steps. In response to a received target integrated energy requirement, the energy efficiency optimization function of a target system is constructed according to an integrated energy requirement parameter, the operating parameter of the target system, and the environment loss parameter of the target system. A constraint condition for optimizing the energy efficiency of the target system is constructed based on the balance relationship between energy supply and energy consumption and a device operating requirement for transmitting energy. Based on the energy efficiency optimization function and the constraint condition, a target algorithm is used, the operating parameters of multiple devices in the target system are used as population individuals, and the operating parameters of the multiple devices are processed to obtain the device parameter of the target system that satisfies the target integrated energy requirement.

According to an embodiment of the present application, the integrated energy requirement parameter includes an actual terminal load parameter, the adjustment parameter of terminal load, and an estimated terminal load parameter. The energy efficiency optimization function of the target system is constructed in the following manners according to the integrated energy requirement parameter, the operating parameter of the target system, and the environment loss parameter of the target system: A first function used for representing energy usage status is constructed according to the estimated terminal load parameter and the actual terminal load parameter; and a second function used for representing energy conversion status is constructed according to the adjustment parameter of the terminal load, the operating parameter of the target system, and the environmental loss parameter of the target system.

According to an embodiment of the present application, the operating parameter of the target system includes an operating duration parameter, an operating energy consumption coefficient, a device quantity parameter, a device operating efficiency parameter, a device operating state parameter, a device operating energy consumption parameter, and a device operating power parameter. The second function used for representing the energy conversion status is constructed in the following manners according to the adjustment parameter of the terminal load, the operating parameter of the target system, and the environmental loss parameter of the target system: A first sub-function used for representing energy loss is constructed according to the operating duration parameter, the operating energy consumption coefficient, the device quantity parameter, the device operating efficiency parameter, and the device operating energy consumption parameter; a second sub-function used for representing device operating loss is constructed according to the device operating efficiency parameter; a third sub-function used for representing a requirement response subsidy is constructed according to the adjustment parameter of the terminal load; a fourth sub-function used for representing device depreciation loss is constructed according to the device quantity parameter, the device operating state parameter, and the device operating power parameter; and a fifth sub-function used for representing environment resource loss during the pollutant emission treatment process of the target system is constructed according to the environmental loss parameter of the target system.

According to an embodiment of the present application, the adjustment parameter of the terminal load includes a transferable load parameter, an adjustable load parameter, and a reducible load parameter. The third sub-function used for representing the requirement response subsidy is constructed in the following manner according to the adjustment parameter of the terminal load: The third sub-function is constructed according to the transferable load parameter, the adjustable load parameter, and the reducible load parameter.

According to an embodiment of the present application, the environmental loss parameter includes a pollutant type parameter, a pollutant emission coefficient, and the resource treatment loss parameter corresponding to the pollutant type parameter. The fifth sub-function used for representing the environment resource loss during the pollutant emission treatment process of the target system is constructed in the following manner according to the environmental loss parameter of the target system: The fifth sub-function is constructed according to the pollutant type parameter, the pollutant emission coefficient, and the resource treatment loss parameter corresponding to the pollutant type parameter.

According to an embodiment of the present application, the constraint condition for optimizing the energy efficiency of the target system is constructed in the following manners based on the balance relationship between the energy supply and the energy consumption and the device operating requirement for transmitting the energy: Based on the balance relationship between the energy supply and the energy consumption, a first constraint condition is constructed according to the estimated terminal load parameter, the actual terminal load parameter, and the device operating energy consumption parameter of the target system; and based on the device operating requirement for transmitting the energy, a second constraint condition is constructed according to the device operating state parameter and the device operating power parameter.

According to an embodiment of the present application, based on the energy efficiency optimization function and the constraint condition, the target algorithm is used, the operating parameters of multiple devices in the target system are used as the population individuals, and the operating parameters of the multiple devices are processed to obtain the device parameter of the target system that satisfies the target integrated energy requirement in the following manners: Based on the energy efficiency optimization function and the constraint condition, the target algorithm is used, the operating parameters of multiple devices in the target system are used as the population individuals to construct an initial population; a population individual in the initial population is processed according to a predetermined fitness function to obtain multiple fitness degrees corresponding to multiple population individuals; a target population individual is determined from the initial population based on the multiple fitness degrees; a genetic operation is performed on the target population individual based on predetermined genetic probability to generate an offspring population; and in the case where the fitness degree of the offspring population and the fitness degree of the initial population are determined to satisfy a predetermined condition, an annealing operation is performed on the offspring population to obtain the device parameter of the target system.

According to an embodiment of the present application, the genetic operation is performed on the target population individual based on the predetermined genetic probability to generate the offspring population in the following manners: A crossover operation is performed on the target population individual based on predetermined crossover probability to obtain a crossover offspring population; and a mutation operation is performed on the crossover offspring population based on predetermined mutation probability to obtain the offspring population.

According to an embodiment of the present application, the number of neighborhoods corresponding to the offspring population is I, and I is an integer greater than 1. The annealing operation is performed on the offspring population to obtain the device parameter of the target system in the following manners: A neighborhood operator is used to process a population individual in the i-th neighborhood corresponding to the offspring population to obtain a first function value corresponding to the population individual in the i-th neighborhood for representing energy usage status and a second function value corresponding to the population individual in the i-th neighborhood for representing energy conversion status; and in the case where the current iteration round is determined not to satisfy an iteration termination condition, the method returns to performing the processing operation on the j-th neighborhood, and i is increased; and in the case where the current iteration round is determined to satisfy the iteration termination condition, the attribute parameter of a population individual in the neighborhood corresponding to the maximum first function value and the attribute parameter of a population individual in the neighborhood corresponding to the minimum second function value are determined as the device parameter of the target system.

A second aspect of the present application provides an apparatus for optimizing system energy efficiency based on an integrated energy requirement. The apparatus includes a first construction module, a second construction module, and a processing module. The first construction module is configured to, in response to the received target integrated energy requirement, construct the energy efficiency optimization function of a target system according to the integrated energy requirement parameter, the operating parameter of the target system, and the environment loss parameter of the target system. The second construction module is configured to construct the constraint condition for optimizing the energy efficiency of the target system based on the balance relationship between the energy supply and the energy consumption and the device operating requirement for transmitting the energy. The processing module is configured to, based on the energy efficiency optimization function and the constraint condition, use the target algorithm, use the operating parameters of multiple devices in the target system as the population individuals, and process the operating parameters of the multiple devices to obtain the device parameter of the target system that satisfies the target integrated energy requirement.

A third aspect of the present application provides an electronic device. The electronic device includes one or more processors and a memory configured to store one or more programs. When executing the one or more programs, the one or more processors perform the preceding method for optimizing system energy efficiency based on an integrated energy requirement.

A fourth aspect of the present application provides a computer-readable storage medium. The storage medium stores executable instructions. When executing the executable instructions, a processor performs the preceding method for optimizing system energy efficiency based on an integrated energy requirement.

BRIEF DESCRIPTION OF DRAWINGS

FIG. 2 is a flowchart of a method for optimizing system energy efficiency based on an integrated energy requirement according to an embodiment of the present application.

DETAILED DESCRIPTION

Figure 1:
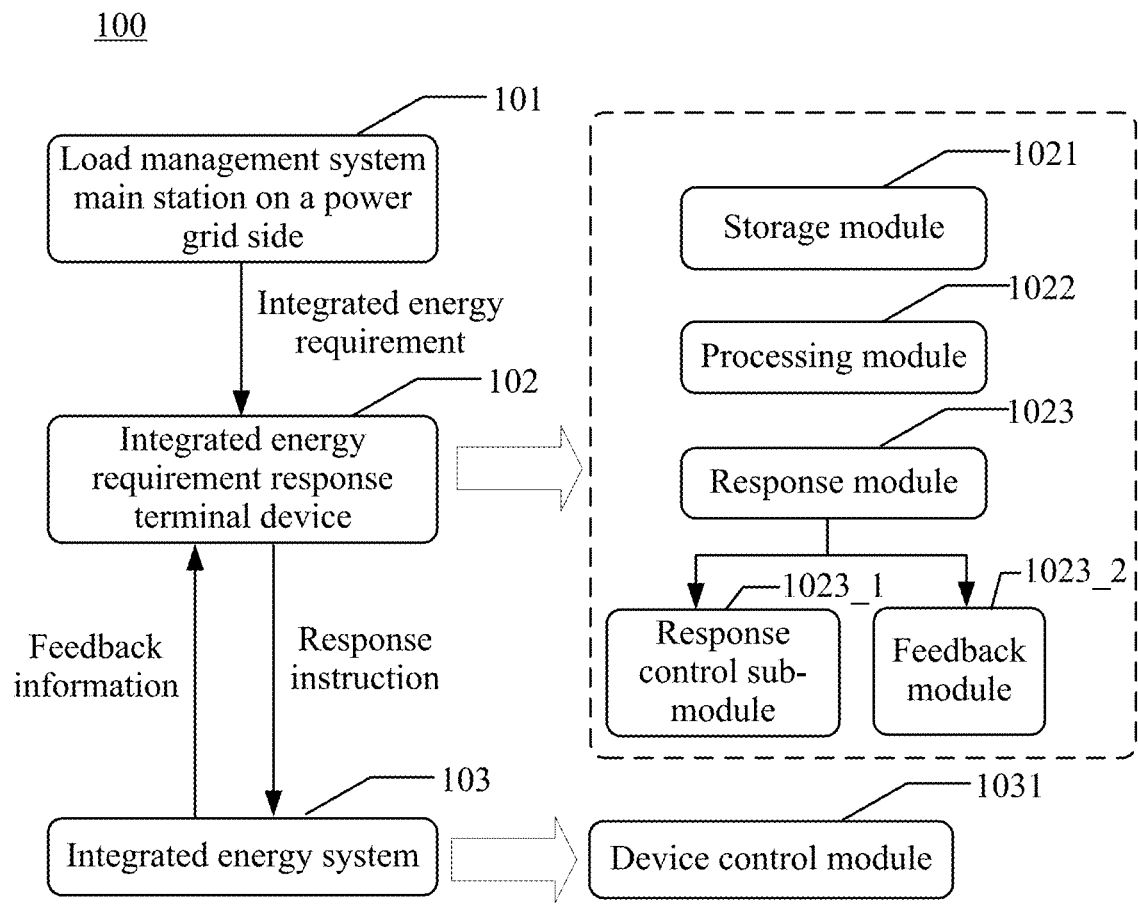
FIG. 1 is a diagram illustrating an application scenario of a method and apparatus for optimizing system energy efficiency based on an integrated energy requirement according to an embodiment of the present application.

Embodiments of the present application are described hereinafter with reference to drawings. These descriptions are merely exemplary and are not intended to limit the scope of the present application. In the description below, for ease of explanation, many details are described to provide an understanding of embodiments of the present application. However, it is apparent that one or more embodiments may also be implemented without these details. In addition, in the description below, the description of well-known structures and technology are omitted to avoid unnecessary confusion about the concept of the present application.

Terms used herein are intended only to describe the embodiments and are not intended to limit the present application. The terms "comprising" and "including" used herein indicate the presence of stated features, steps, operations, and/or components without excluding the presence or addition of one or more other features, steps, operations, or components.

All terms used herein (including technical terms and scientific terms) have meanings the same as those commonly understood by those skilled in the art unless otherwise defined. The terms used herein should be interpreted as having meanings consistent with their meanings in the context of the specification and should not be interpreted in an idealized or overly rigid manner.

In the case where expressions such as "at least one of A, B, or C" are used, the expressions should generally be interpreted according to the meaning of the expression commonly understood by those skilled in the art (for example, "a system having at least one of A, B, or C" should include a system having A alone, a system having B alone, a system having C alone, a system having A and B, a system having A and C, a system having B and C, and/or a system having A, B, and C).

An integrated energy system is a research hotspot in recent years, and research results on the optimal operation of multi-energy resources such as electrical cooling and heating are fruitful. With the accelerated advancement of the construction of a new electrical power system, the urgency of the research on energy supply guarantee and requirement response technology is increasingly prominent, but there is little systematic research on integrated energy requirement response.

With the construction of a smart city, the electricity consumption efficiency of the power grid is improved through information communication and the Internet of Things technology, which becomes an important support means of comprehensive energy utilization management. The research progress of technology related to integrated energy requirement response is as follows.

1. A control center is constructed. The device model and the prediction load model of the multi-energy integrated utilization system are developed. The schedulable feature and reliability of the multi-energy integrated utilization system, especially the perfection of the system, are simulated and researched. The impact of a distributed energy system and an energy storage device on the power grid is researched from the aspects of voltage stability, load flow, electrical energy quality, frequency changes, changes in a fault current, system security, and stability.

2. A modular multi-energy integrated residential hot water system has a fast-assembly module that flexibly satisfies different requirements. The standard interface equipped may be conveniently connected to an air source heat pump and a solar thermal collector.

3. Renewable energy sources, such as solar energy, are combined with other forms of energy supply to implement integrated energy utilization. For example, a split air source heat pump not only has a function of a conventional air source heat pump, but also has a physical interface and a logic interface that are associated with other heat source apparatuses (such as a solar thermal collector and a gas boiler).

4. A small gas turbine is configured to compensate for the output fluctuation of new energy generation to reduce the investment in expensive energy storage, thereby implementing the object of multi-energy integrated utilization.

In-depth research is carried out in the areas of the integration and design of a distributed combined cooling, heating and power system, the key technology and device development of a gas turbine and a waste heat utilization apparatus, and system operation and control. For example, a micro gas turbine is used as a core, and a direct-fired absorption lithium bromide refrigerator and a waste heat boiler are combined. A demonstration "energy island" is constructed for research on the distributed energy system. The micro gas turbine is used as the core, and the distributed energy system that uses hotels as the application objects is constructed.

For the problem of multi-energy optimization configuration, the object is to minimize system investment (device costs, operation and maintenance costs, and device replacement costs), the number of photovoltaic cells, the number of fans mounted, and the height of a fan tower are optimization variables, and power supply reliability, the upper and lower limits of the height of the fan tower, and excess energy rate are constraint conditions, and the power supply of a wind-solar-storage independent power supply system is optimized.

For the research of an integrated energy management system, based on short-term power prediction and ultra-short-term power prediction, the output feature and the load operation feature of at least one micro-source are comprehensively considered, and an energy optimization model suitable for an independent power grid is constructed. The model uses the minimum operating cost as an objective function and researches the energy optimization coordination control strategy of a composite system from two temporal scales: day-ahead and intra-day.

For an independent microgrid system including wind power generation, diesel engine generation, energy storage, and seawater desalination, an energy management method based on ultra-short-term power prediction is researched, and an energy management strategy based on ultra-short-term wind speed prediction is proposed.

However, the accuracy of information data interaction between a terminal user and an application system is relatively low, and the communication reliability is not high. The existing multi-energy integrated utilization technology has relatively simple functions. How to implement regional multi-energy information fusion management, make decisions on integrated energy utilization based on different energy regulation requirements, and improve the energy utilization efficiency requires in-de p-th research, and the development of key equipment to implement integrated energy optimization and utilization is not yet mature.

In view of this, an embodiment of the present application provides a method for optimizing system energy efficiency based on an integrated energy requirement, constructs an operation optimization model of a requirement-side integrated energy system, uses integrated energy efficiency and resource loss as optimization objectives, and clarifies the feature and solution feature of the optimization model by analyzing model composition. The optimization objectives may be selected based on system resource friendliness, system environment friendliness, and the overall system energy efficiency to maximize the energy efficiency and minimize the resource loss of the integrated energy system.

In the technical solutions of the present application, the user information (including user personal information, user image information, user device information, such as location information) and data (including data used for analysis, storage, and display) involved are all information and data authorized by the user or fully authorized by multiple parties. The acquisition, storage, use, processing, transmission, provision, disclosure, and application of relevant data comply with the relevant laws, regulations, and standards of the relevant countries and regions, take necessary confidentiality measures, and do not violate public order and good customs. The corresponding operation entry is provided for the user to choose to authorize or reject.

FIG. 1 is a diagram illustrating an application scenario of a method and apparatus for optimizing system energy efficiency based on an integrated energy requirement according to an embodiment of the present application.

As shown in FIG. 1, an application scenario 100 of this embodiment may include a load management system main station 101 on a power grid side, an integrated energy requirement response terminal device 102, and an integrated energy system 103.

The method for optimizing system energy efficiency based on an integrated energy requirement provided by the present application may be performed by the integrated energy requirement response terminal device 102. The integrated energy requirement response terminal device 102 acquires a target integrated energy requirement from the load management system main station 101 at the power grid side. The method for optimizing system energy efficiency based on an integrated energy requirement provided by this embodiment of the present application is executed based on the target integrated energy requirement to obtain the device parameter of the integrated energy system that satisfies the target integrated energy requirement. Response instructions are generated through the device parameter of the integrated energy system. The response instructions are sent to the integrated energy system 103, so that a device control module 1031 in the integrated energy system 103 controls a corresponding device to adjust the device parameter to the device parameter in the response instructions. At the same time, the integrated energy system 103 may also send the system operating state after the device parameter is adjusted to the integrated energy requirement response terminal device 102 in the form of feedback information to implement the interaction between the integrated energy system and the integrated energy requirement at the power grid side.

According to this embodiment of the present application, the integrated energy requirement response terminal device 102 may include a storage module 1021, a processing module 1022, and a response module 1023.

According to this embodiment of the present application, the storage module 1021 is configured to store the application program required to execute the method for optimizing system energy efficiency based on an integrated energy requirement provided by the present application to ensure that the program is stably stored in the integrated energy requirement response terminal device 102, thereby calling the relevant application program in time according to the integrated energy requirement.

According to this embodiment of the present application, the processing module 1022 is configured to execute the application program in the storage module 1021 to execute the method for optimizing system energy efficiency based on an integrated energy requirement provided by the present application.

According to this embodiment of the present application, the response module 1023 may include a response control sub-module 1023_1 and a feedback module 1023_2. The response control sub-module 1023_1 is configured to send the device parameter of the integrated energy system that satisfies the target integrated energy requirement obtained by the processing module 1022 to the integrated energy system 103 in the form of response instructions. The feedback module 1023_2 is configured to receive the system operating state information of the integrated energy system 103 after the device parameter is adjusted.

The number of load management system main stations 101 at the power grid side, integrated energy requirement response terminal devices 102, and integrated energy systems 103 in FIG. 1 is merely illustrative. According to implementation requirements, there may be any number of load management system main stations at the power grid side, integrated energy requirement response terminal devices, and integrated energy systems.

Figure 3:
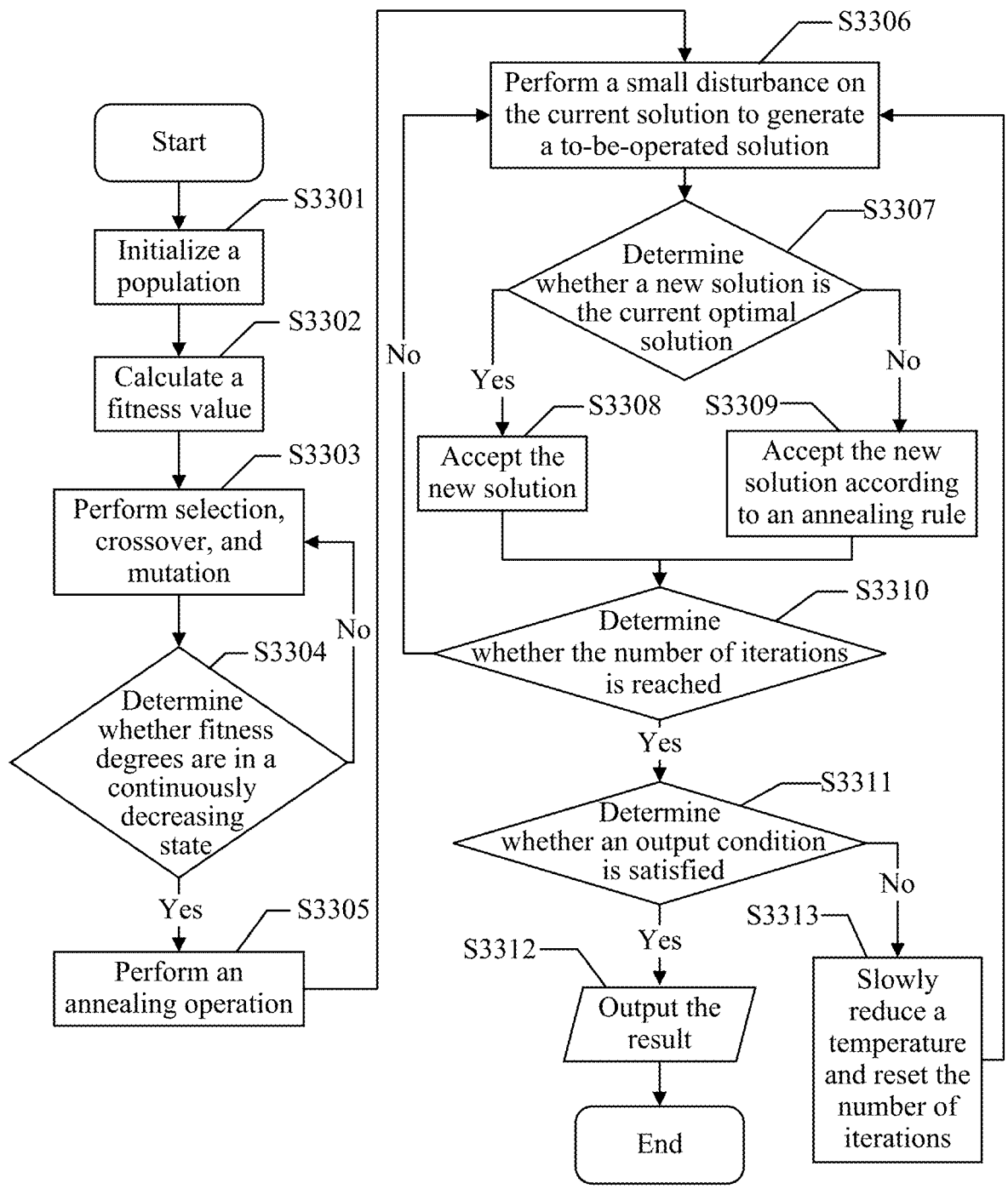
FIG. 3 is a flowchart of operations of using a target algorithm, using the operating parameters of multiple devices in a target system as population individuals, and processing the operating parameters of the multiple devices according to an embodiment of the present application.

Based on the scenario described in FIG. 1, the following describes the method for optimizing system energy efficiency based on an integrated energy requirement according to this embodiment of the present application through FIGS. 2 to 3.

FIG. 2 is a flowchart of a method for optimizing system energy efficiency based on an integrated energy requirement according to an embodiment of the present application.

As shown in FIG. 2, the method for optimizing system energy efficiency based on an integrated energy requirement of this embodiment 200 includes operations S210 to S230.

In operation S210, in response to the received target integrated energy requirement, the energy efficiency optimization function of a target system is constructed according to an integrated energy requirement parameter, the operating parameter of the target system, and the environment loss parameter of the target system.

In operation S220, a constraint condition for optimizing the energy efficiency of the target system is constructed based on the balance relationship between energy supply and energy consumption and a device operating requirement for transmitting energy.

In operation S230, based on the energy efficiency optimization function and the constraint condition, a target algorithm is used, the operating parameters of multiple devices in the target system are used as population individuals, and the operating parameters of the multiple devices are processed to obtain the device parameter of the target system that satisfies the target integrated energy requirement.

According to this embodiment of the present application, the target system may be an integrated energy system. The target integrated energy requirement may include the total amount of energy and load purchased by the user acquired from an external energy network. The total amount of energy may include the total amount of electrical energy and the total amount of natural gas. The total amount of load may include the amount of electric load and the amount of thermal load.

According to this embodiment of the present application, the integrated energy requirement parameter may include an actual terminal load parameter, the adjustment parameter of terminal load, and an estimated terminal load parameter.

According to this embodiment of the present application, the operating parameter of the target system may include an operating duration parameter, an operating energy consumption coefficient, a device quantity parameter, a device operating efficiency parameter, a device operating state parameter, a device operating energy consumption parameter, and a device operating power parameter.

According to this embodiment of the present application, the environmental loss parameter of the target system may include a pollutant type parameter, a pollutant emission coefficient, and the resource treatment loss parameter corresponding to the pollutant type parameter.

According to this embodiment of the present application, the energy efficiency optimization function of the target system may include the energy efficiency maximization function of the target system and the resource loss minimization function of the target system. The energy efficiency of the target system may represent the energy conversion efficiency of the target system. The energy conversion efficiency may be determined based on the energy load on a user side, the total amount of purchased energy, and the energy quality coefficient of the related energy.

According to this embodiment of the present application, the resource loss may include input energy loss, device operating loss, requirement response subsidy loss, device depreciation loss, and environmental pollution loss.

According to this embodiment of the present application, the balance relationship between the energy supply and the energy consumption may include the balance relationship between the supply and consumption of the electrical energy of the integrated energy system and the balance relationship between the supply and consumption of the thermal energy of the integrated energy system.

According to this embodiment of the present application, the device operating requirement for transmitting the energy may represent the limit range of the device operating parameter that is satisfied by all devices in the integrated energy system for operating stability during the energy transmission process.

According to this embodiment of the present application, a multi-objective to-be-optimized function including integrated energy efficiency maximization and resource loss minimization may be obtained based on the energy efficiency optimization function and the constraint condition. The multi-objective to-be-optimized function and the constraint condition are used as to-be-optimized problems that satisfy the target integrated energy requirement. The target algorithm is used, the operating parameters of multiple devices in the target system are used as the population individuals, and the operating parameters of the multiple devices are processed to obtain the device parameter of the target system that satisfies the target integrated energy requirement.

According to this embodiment of the present application, the target algorithm may include a genetic algorithm, a simulated annealing algorithm, and a genetic-simulated annealing algorithm.

According to this embodiment of the present application, since the energy efficiency optimization function of the target system is constructed based on the integrated energy requirement parameter, the operating parameter of the target system, and the environmental loss parameter of the target system, the energy efficiency optimization of the integrated energy system based on the actual integrated energy requirement at a requirement side is implemented. In the case where the target integrated energy requirement is satisfied, the technical effect of improving system energy efficiency and reducing system resource loss is implemented.

According to this embodiment of the present application, the energy efficiency optimization function of the target system is constructed in the following operations according to the integrated energy requirement parameter, the operating parameter of the target system, and the environment loss parameter of the target system. A first function used for representing energy usage status is constructed according to the estimated terminal load parameter and the actual terminal load parameter; and a second function used for representing energy conversion status is constructed according to the adjustment parameter of the terminal load, the operating parameter of the target system, and the environmental loss parameter of the target system.

According to this embodiment of the present application, the estimated terminal load parameter may represent the total amount of pre-purchased energy on the user side, for example, the total amount of energy may include the total electrical energy $W_e$ and the total natural gas $W_g$.

According to this embodiment of the present application, the actual terminal load parameter may represent the total energy load at the user side, for example, the total energy load may include the total electric load $L_e$ and the total thermal load $L_h$.

According to this embodiment of the present application, the first function may be shown in formula (1):

$$\max \eta_{IES} = \frac{L_e + L_h \lambda_h}{W_e + W_g \lambda_g} \quad (1)$$

$W_e$ denotes the total electrical energy pre-purchased at the user side. $W_g$ denotes the total natural gas pre-purchased at the user side. $L_e$ denotes the total electric load at the user side. $L_h$ denotes the total thermal load at the user side. $\lambda_h$ denotes the energy quality coefficient of the heat load and the natural gas. $\lambda_g$ denotes the energy quality coefficient of the electric load and the electrical energy.

According to this embodiment of the present application, the energy quality coefficient of the electric load and the electrical energy may be determined according to the combustion temperature of the natural gas when the natural gas is completely combusted during the operation of the integrated energy system and the ambient temperature during the operation of the system. For example, the energy quality coefficient of the electric load and the electrical energy may be calculated according to formula (2):

$$\lambda_g = 1 - \frac{T_0}{T - T_0} l_n \frac{T}{T_0} \quad (2)$$

To denotes the ambient temperature during the operation of the system. T denotes the combustion temperature of the natural gas when the natural gas is completely combusted during the operation of the integrated energy system.

According to this embodiment of the present application, the energy quality coefficient of the heat load and the natural gas may be determined according to the ambient temperature during the operation of the system and the heating temperature on the user side. For example, the energy quality coefficient of the heat load and the natural gas may be calculated according to formula (3):

$$\lambda_h = 1 - \frac{T_0}{T_h} \quad (3)$$

$T_0$ denotes the ambient temperature during the operation of the system. $T_h$ denotes the heating temperature on the user side.

According to this embodiment of the present application, the second function may represent the resource loss of the integrated energy system. Since the resource loss may include input energy loss, device operating loss, requirement response subsidy loss, device depreciation loss, and environmental pollution loss, the adjustment parameter of the terminal load may be used to construct a requirement response subsidy loss function; the operating parameter of the target system is used to construct an input energy loss function, a device operating loss function, and a device depreciation loss function; and the environmental loss parameter of the target system is used to construct the environmental pollution loss.

According to this embodiment of the present application, the second function may be shown in formula (4):

$$\min C = C_1 + C_2 + C_3 + C_4 + C_5 \quad (4)$$

C denotes the second function. $C_1$ denotes the input energy loss function. $C_2$ denotes the device operating loss function. $C_3$ denotes the requirement response subsidy function. $C_4$ denotes the device depreciation loss function. $C_5$ denotes an environmental pollution loss function.

According to this embodiment of the present application, the energy efficiency optimization function is constructed from the perspective of maximizing the energy efficiency of the integrated energy system and minimizing the resource consumption of the integrated energy system. The device parameter may be adjusted in time according to the target integrated energy requirement to satisfy the integrated energy requirement at the user side, improve the energy efficiency of the integrated energy system, and reduce the resource loss of the integrated energy system.

The operating parameter of the target system includes an operating duration parameter, an operating energy consumption coefficient, a device quantity parameter, a device operating efficiency parameter, a device operating state parameter, a device operating energy consumption parameter, and a device operating power parameter.

According to this embodiment of the present application, a first sub-function used for representing energy loss is constructed according to the operating duration parameter, the operating energy consumption coefficient, the device quantity parameter, the device operating efficiency parameter, and the device operating energy consumption parameter. The first sub-function may represent the input energy loss function.

For example, the first sub-function may be constructed according to formula (4-1):

$$C_1 = \sum_{t=1}^{T} \left( \sum_{i=1}^{N} \left( \frac{c_{g(t)} g_n}{\eta i} \right) + W_e(t) c_e(t) \right) \quad (4-1)$$

$c_g(t)$ denotes the energy consumption value of the electric energy in a period t. $c_e(t)$ denotes the energy consumption value of the natural gas in the period t. T denotes the total operating duration of the integrated energy system. N denotes the total number of devices in the integrated energy system. $\eta_i$ denotes the operating efficiency of the i-th device. $g_n$ denotes the usage amount of the natural gas of the i-th device in the operating stage per unit time. $W_e(t)$ denotes the usage amount of the electrical energy in the period t.

According to this embodiment of the present application, a second sub-function used for representing device operating loss is constructed according to the device operating efficiency parameter. The second sub-function may represent a device operating loss function.

For example, the second sub-function may be constructed according to formula (4-2):

$$c_2 = \sum_{t=1}^{T} \sum_{i=1}^{N} [c_{r,i} P_i(t)] \quad (4-2)$$

$c_{r,i}$ denotes the unit operating loss of the i-th device. $P_i(t)$ denotes the output power of the i-th device in the period t.

According to this embodiment of the present application, a third sub-function used for representing a requirement response subsidy is constructed according to the adjustment parameter of the terminal load. The third sub-function may represent a requirement response subsidy function.

According to this embodiment of the present application, the adjustment parameter of the terminal load includes a transferable load parameter, an adjustable load parameter, and a reducible load parameter. The third sub-function is constructed according to the transferable load parameter, the adjustable load parameter, and the reducible load parameter.

For example, the third sub-function may be constructed according to formula (4-3):

$$C_3 = \sum_{t=1}^{T} (c_{TL} E_{TL}(t) + c_{RL} E_{RL}(t) + c_{AL} E_{AL}(t)) \quad (4-3)$$

$c_{TL}$ denotes the unit compensation parameter of transferable load. $c_{RL}$ denotes the unit compensation parameter of reducible load. $c_{AL}$ denotes the unit compensation parameter of adjustable thermal load. $E_{TL}(t)$ denotes the total amount of actual transfer of the transferable load in the period t. $E_{RL}(t)$ denotes the total amount of actual reduction of the reducible load in the period t. $H_{AL}(t)$ denotes the total amount of actual variation of the adjustable thermal load in the period t.

According to this embodiment of the present application, a fourth sub-function used for representing the device depreciation loss is constructed according to the device quantity parameter, the device operating state parameter, and the device operating power parameter. The fourth sub-function may represent a device depreciation loss function.

For example, the fourth sub-function may be constructed according to formula (4-4):

$$C_4 = \sum_{t=1}^{T} \sum_{i=1}^{N} \left[ \frac{c_{inv,i} \lambda_r}{P_{m,i} t_{m,i}} P_i(t) \right] \quad (4\text{-}4)$$

$c_{inv,i}$ denotes the full usage loss of the i-th device. $\lambda_r$ denotes a device recovery coefficient. $P_{m,i}$ denotes the rated power of the i-th device. $t_{m,i}$ denotes the maximum usable duration of the i-th device. $P_i(t)$ denotes the output power of the i-th device in the period t.

According to this embodiment of the present application, a fifth sub-function used for representing the environment resource loss during the pollutant emission treatment process of the target system is constructed according to the environmental loss parameter of the target system. The fifth sub-function may represent the environmental pollution loss function.

According to this embodiment of the present application, the environmental loss parameter includes a pollutant type parameter, a pollutant emission coefficient, and the resource treatment loss parameter corresponding to the pollutant type parameter. The fifth sub-function used for representing the environment resource loss during the pollutant emission treatment process of the target system is constructed in the following manner according to the environmental loss parameter of the target system: The fifth sub-function is constructed according to the pollutant type parameter, the pollutant emission coefficient, and the resource treatment loss parameter corresponding to the pollutant type parameter.

For example, the fifth sub-function may be constructed according to formula (4-5):

$$C_5 = \sum_{p=1}^{P} c_p \left( \sum_{t=1}^{T} \sum_{i=1}^{N} P_i(t) \eta_r \right) \quad (4\text{-}5)$$

$c_p$ denotes the treatment loss of the p-th pollutant. P denotes the total number of pollutant types. $\eta_r$ denotes the emission coefficient of a pollutant. $P_i(t)$ denotes the output power of the i-th device in the period t.

According to this embodiment of the present application, the requirement response subsidy loss and the environmental pollution loss are added to the resource loss function of the integrated energy system, which may be adapted to the response scenario of the energy gradient requirement at the current user side. In this manner, changing factors such as changes in the integrated energy requirement and changes in an integrated energy requirement subsidy during the peak period of energy use are responded promptly, the device parameter of the integrated energy system is adjusted, and the integrated energy requirement at the user side is satisfied.

According to this embodiment of the present application, in the optimization process of the energy efficiency of the integrated energy system, the balance between the energy supply and the energy consumption and the device stability during energy transmission are the key to ensuring the normal operation of the integrated energy system. Thus, the constraint condition is constructed based on the balance between the energy supply and the energy consumption and the operating requirement of the device stability during energy transmission.

For example, based on the balance relationship between the energy supply and the energy consumption, a first constraint condition is constructed according to the estimated terminal load parameter, the actual terminal load parameter, and the device operating energy consumption parameter of the target system. The first constraint condition may be shown in formula (5):

$$\begin{cases} \sum_{t=1}^{T} W_e(t) = \sum_{t=1}^{T} (W_{el}(t) + W_{ed}(t)) \\ \sum_{t=1}^{T} \sum_{i=1}^{N} W_g(t) \eta_i = \sum_{t=1}^{T} (W_{hl}(t) + W_{hd}(t)) \end{cases} \quad (5)$$

$W_{el}(t)$ denotes the electric load requirement at the user side in the period t. $W_{ed}(t)$ denotes the electricity consumption of the electric drive device in the integrated energy system in the period t. $W_{hl}(t)$ denotes the thermal load requirement at the user side in the period t. $W_{hd}(t)$ denotes the thermal consumption of the thermal drive device in the integrated energy system in the period t. $W_g(t)$ denotes the usage amount of the natural gas in the period t.

According to this embodiment of the present application, based on the device operating requirement for transmitting the energy, a second constraint condition is constructed according to the device operating state parameter and the device operating power parameter. The second constraint condition may be shown in formula (6):

$$\begin{cases} P_{min}(t)\theta(t) \leq P_i(t) \leq P_{max}(t)\theta(t) \\ \Delta P_{min}(t)\theta(t) \leq \Delta P_i(t) \leq \Delta P_{max}(t)\theta(t) \\ \theta(t) = 1 \text{ on} \\ \theta(t) = 0 \text{ off} \end{cases} \quad (6)$$

$P_{min}$ denotes the lower limit of the output power of a device of the integrated energy system. $P_{max}$ denotes the upper limit of the output power of the device of the integrated energy system. $\Delta P_{min}$ denotes the lower limit of the climbing rate of the device of the integrated energy system. $\Delta P_{max}$ denotes the upper limit of the climbing rate of the device of the integrated energy system. $\theta(t)$ denotes the start or stop state of the device. $\theta(t)=1$ denotes that the device is turned on. $\theta(t)=0$ denotes that the device is turned off. $P_i(t)$ denotes the climbing rate of the i-th device of the integrated energy system.

FIG. 3 is a flowchart of operations of using a target algorithm, using the operating parameters of multiple devices in a target system as population individuals, and processing the operating parameters of the multiple devices according to an embodiment of the present application.

As shown in FIG. 3, the process 300 of processing the operating parameters of the multiple devices may include operations S3301 to S3313.

In operation S3301, a population is initialized.

According to this embodiment of the present application, based on the energy efficiency optimization function and the constraint condition, the target algorithm may be used, the operating parameters of multiple devices in the target system may be used as population individuals, and an initial population is constructed.

In operation S3302, a fitness value is calculated.

According to this embodiment of the present application, a population individual in the initial population may be processed according to a predetermined fitness function to obtain multiple fitness degrees corresponding to multiple population individuals.

According to this embodiment of the present application, a target population individual is determined from the initial population based on the multiple fitness degrees. For example, a population individual whose fitness degree is greater than a fitness threshold is used as the target population individual.

According to this embodiment of the present application, the fitness value may be adaptively adjusted by using formula (7):

$$P_{cr(mu)}(T') = -0.5\cos\left(\frac{1}{T' \times gen} \cdot \frac{\pi}{2}\right) \quad (7)$$

T' denotes the reciprocal of the current evolutional generation. gen denotes the set total number of iterations.

In operation S3303, selection, crossover, and mutation are performed.

According to this embodiment of the present application, a genetic operation is performed on the target population individual based on predetermined genetic probability to generate an offspring population. The predetermined genetic probability may include predetermined crossover probability $P_{cr}$ and predetermined mutation probability $P_{mu}$. A crossover operation is performed on the target population individual based on the predetermined crossover probability to obtain a crossover offspring population. A mutation operation is performed on the crossover offspring population based on the predetermined mutation probability to obtain the offspring population.

The number of neighborhoods corresponding to the offspring population is I, and I is an integer greater than 1. An annealing operation is performed on the offspring population to obtain the device parameter of the target system in the following manners: A neighborhood operator is used to process a population individual in the i-th neighborhood corresponding to the offspring population to obtain a first function value corresponding to the population individual in the i-th neighborhood for representing energy usage status and a second function value corresponding to the population individual in the i-th neighborhood for representing energy conversion status; in the case where the current iteration round is determined not to satisfy an iteration termination condition, the method returns to performing the processing operation on the i-th neighborhood, and i is increased; and in the case where the current iteration round is determined to satisfy the iteration termination condition, the attribute parameter of a population individual in the neighborhood corresponding to the maximum first function value and the attribute parameter of a population individual in the neighborhood corresponding to the minimum second function value are determined as the device parameter of the target system. The maximum first function value refers to the corresponding maximum first function value in I neighborhoods. The minimum first function value refers to the corresponding minimum second function value in the I neighborhoods.

According to this embodiment of the present application, two parental chromosomes may be selected according to the predetermined crossover probability $P_{cr}$ to perform a crossover operation to generate offspring chromosomes. A repair operator is used to repair the missing points in the crossover process, aiming to solve missing and duplicate problems. The essence of the repair operator is actually a comparison and screening process. A crossover operator is used on pairs of individuals to exchange chromosome genes with a certain probability to produce individuals having new performance. Relatively large crossover probability may increase the range of search space but may also increase the probability of destruction. Relatively small crossover probability may cause a search state to fall into a blunt state. The value range of general predetermined crossover probability is 0.25 to 1.00.

According to this embodiment of the present application, the offspring chromosomes that undergo crossover processing are selected according to the predetermined mutation probability $P_{mu}$ to perform a mutation operation to generate mutant offspring chromosomes. A mutation operator is used for altering part of the genes of the selected individual into other allelic genes with a certain probability. The mutation probability is an auxiliary search operation in the algorithm and is introduced to maintain population diversity. The mutation probability may effectively prevent the loss of important genes. However, an excessive high mutation frequency may also cause the algorithm to be disturbed. The value range of general predetermined mutation probability is 0.001 to 0.1.

In operation S3304, it is determined whether fitness degrees are in a continuously decreasing state. If so, operation S3305 is executed. If not, the method returns to executing operation S3303 to update the population.

According to this embodiment of the present application, it is determined whether the fitness values of the optimal solution of the population are in a continuously decreasing state. If the preceding state occurs, the current optimal solution S is output, and operation S3305 is executed to perform an annealing operation. Otherwise, the operation S3303 continues to perform crossover and mutation operations. Only when the annealing operation is performed on the fitness degrees already in the continuously decreasing state, a specific significance is obtained. It indicates that the operation of the genetic algorithm in a first stage plays a role in finding the direction in which the solution decreases most rapidly. Thus, it is necessary to continue to perform the annealing operation in this direction to obtain the optimal solution. The introduction of the annealing idea may allow a small number of parental generations having high fitness degrees to compete with their offspring generations to accelerate the evolution and solution speed. At the same time, the speed and accuracy of the population evolution efficiency and algorithm solution may also be ensured.

In operation S3305, the annealing operation is performed.

In the case where the fitness degree of the offspring population and the fitness degree of the initial population are determined to satisfy a predetermined condition, the annealing operation is performed on the offspring population to obtain the device parameter of the target system.

In operation S3306, a small disturbance is performed on the current solution to generate a to-be-operated solution.

According to this embodiment of the present application, the current temperature is set to $T_p=T_1$, and the number of iterations $L_p$ at this temperature is set to 0. The optimal solution S obtained in operation S3304 is set as the current solution $S_n$. Since a global optimization problem requires a search method in which local search and global search are combined, the former ensures search accuracy, and the latter ensures avoidance of falling into the local optimum. A sufficiently large initial value $T_1$ enables the algorithm to converge, all feasible solutions in the search space are traversed, values that are too large or too small may not implement the global optimum.

In operation S3307, it is determined whether a new solution is the current optimal solution. If so, operation S3308 is executed. If not, operation S3309 is executed.

In operation S3308, the new solution is accepted.

In operation S3309, the new solution is accepted according to an annealing rule.

According to this embodiment of the present application, if $T_p>T_{end}$, the annealing operation continues. Otherwise, the algorithm ends, and the current solution is output as the optimal solution. The termination temperature $T_{end}$ is usually 0 but consumes a lot of simulation time. The temperature approaches 0, and the surrounding states are almost the same. Thus, a temperature that is low enough to be acceptable is found.

In operation S3310, it is determined whether the number of iterations is reached. If so, operation S3311 is executed. If not, the method returns to executing operation S3306.

According to this embodiment of the present application, if $L_p>L$, $L_p=L_p+1$, and the method goes to step S3305. Otherwise, $L_p=0$, $L_p=T_p\times R_T$, and the method goes to operation S3311. That is, if the maximum number of iterations (step length) is reached, the algorithm ends, and the optimal solution and final step length are output. Otherwise, the annealing operation continues. The step length L controls the sufficient degree and accuracy of algorithm optimization and is adjusted according to actual conditions and specific problems. The value of cooling rate $R_T$ is generally 0.5 to 0.99. This parameter determines the speed of the cooling process. The larger the parameter is, the slower the cooling process is, which indirectly affects the increase in the number of iterations and may increase the probability of global optimization. The parameter relationship between two adjacent generations is $T_{i+1}=R_T T_i$. $R_T$ denotes a cooling rate. If $T_i$ reaches thermal equilibrium during the search process, $T_{i+1}$ only needs a small amount of state transformation to reach a quasi-equilibrium state, thereby reducing an inner loop.

In operation S3311, it is determined whether an output condition is satisfied. If so, operation S3312 is executed. If not, operation S3313 is executed.

In operation S3312, the result is output.

In operation S3313, the temperature is slowly reduced, and the number of iterations is reset, and the method returns to executing the annealing operation.

According to this embodiment of the present application, a neighborhood operator is used for generating a neighborhood solution, and it is determined whether the neighborhood solution is better than the current solution $S_n$. If so, the current solution is used to replace the neighborhood solution. Otherwise, the better value is used to replace a suboptimal value, and the operation is repeated. It is necessary to define $\Delta E=E(x_{t+1})-E(x_t)$ in advance. $E(\ )$ denotes the objective function value of a simulated annealing operation.

According to the Metropolis criterion, if $\Delta E<0$, where $x_t$ denotes the current operator state, the new solution is accepted and used as the current solution. Otherwise, whether to accept the new solution is determined according to an acceptance probability function $$e^{-\frac{\Delta T}{T}}.$$

T denotes the current temperature.

According to this embodiment of the present application, whether the current number of iterations or the optimal solution satisfies an output condition is determined to determine the final output result. The obtained output result is the parameters of multiple devices that satisfy the target integrated energy requirement and have the maximum energy efficiency and the minimum resource loss of the integrated energy system.

According to this embodiment of the present application, when the method for optimizing system energy efficiency provided by the present application is executed, the formulas (1), (2), (3), (4), (4-1), (4-2), (4-3), (4-4), and (4-5) described above may be combined into a multi-objective optimization mathematical model, and a genetic annealing algorithm is performed for calculation based on the constraint conditions of the formulas (5) and (6).

According to this embodiment of the present application, the hardware environment used for executing the method for optimizing system energy efficiency provided by the present application is as follows. The Windows 10 operating system is used, the central processing unit (CPU) is Intel Core i7-9750H (2.6 GHz/L3 12M), the memory is 8 GB, and programming is performed using the MATLAB2021b environment.

According to this embodiment of the present application, when the method of this embodiment of the present application is executed, the following parameters may be preset. The maximum number of iterations L is 500, a population size Np is 200, a generation gap GAPG is 0.7, the mutation probability $P_{mu}$ is 0.05, the crossover probability $P_{cr}$ is 0.8, the cooling rate $R_T$ is 0.98, the initial temperature $T_0$ is 100, and the termination temperature $T_{end}$ is 0.

According to this embodiment of the present application, the model parameters of the multi-objective optimization mathematical model are as follows.

$T_0$ is 25° C., $T_1$ is 1500° C., and $T_h$ is 30° C. $\lambda_h$ and $\lambda_g$ are 0.17 and 0.93 respectively, the energy quality coefficients of the electric load and the electrical energy are both 1. $c_g(t)$ and $c_e(t)$ are random numbers, and the value ranges are $[2.5\times10^4$ J, $3.7\times10^4$ J] and $[2.3\times10^3$ J, $6.8\times10^3$ J] respectively. T is 20 h. N is 10. $\eta_i$ is a random number, and the value range is [0.7, 0.8]. $g_n$ is a random number, and the value range is [1.2 m³, 1.4 m³]. $W_e(t)$ is set to 120 kWh (average). $c_{r,i}$ is a random number, and the value range is $[5\times10^3, 7\times10^3]$. $P_i(t)$ is a random number, and the value range is [1 kW, 3.5 kW]. $c_{TL}$, $c_{RL}$, and $c_{AL}$ are $3\times10^2$, $2\times10^2$, and $4\times10^2$ respectively, and $E_{TL}(t)$, $E_{RL}(t)$, and $H_{AL}(t)$ are 13 kWh, 12 kWh, and 14 kWh respectively (average). $c_{inv,i}$ is a random number, and the value range is $[6\times10^6$ J, $8\times10^6$ J]. $\lambda_r$ is 0.8, $P_{m,i}$ is a random number, and the value range is [2 KW, 5 KW]. $t_{m,i}$ is 43800 h (5 years). The value of $c_p$ is $\{5\times10^3, 4\times10^3, 8\times10^3, 6\times10^3\}$. P is 4, and $\eta_r$ is 0.7. $P_{min}$ and $P_{max}$ are 1 kW and 3.5 kW respectively, and $\Delta P_{min}$ and $\Delta P_{max}$ are 75 W and 300 W, respectively.

To demonstrate the algorithm execution effect of this embodiment of the present application, the description below is in conjunction with FIGS. 4A to 4C.

Figure 4A:
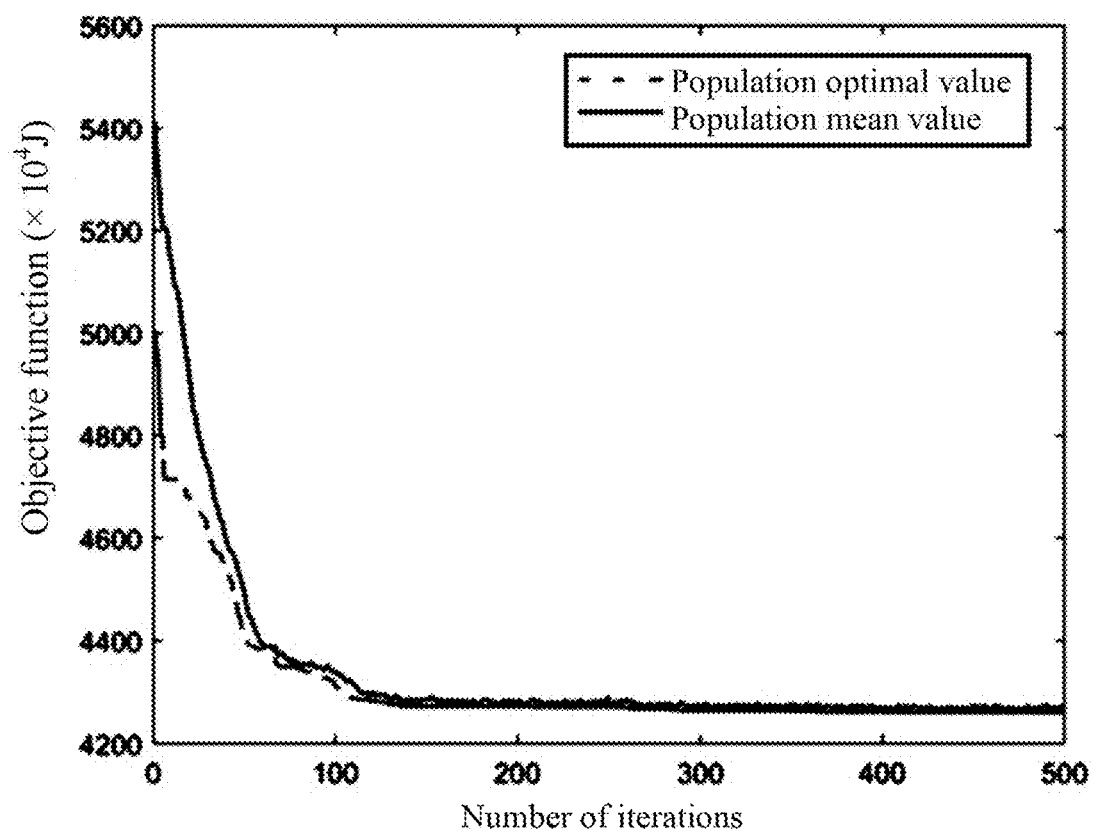
FIG. 4A is a diagram illustrating a result of operations of using a genetic algorithm, using the operating parameters of multiple devices in a target system as population individuals, and processing the operating parameters of the multiple devices according to an embodiment of the present application.

FIG. 4A is a diagram illustrating a result of operations of using a genetic algorithm, using the operating parameters of multiple devices in a target system as population individuals, and processing the operating parameters of the multiple devices according to an embodiment of the present application.

As shown in FIG. 4A, in the process of genetic algorithm processing, the algorithm operating duration is 476.2 s, the obtained final resource loss is $4256.83 \times 10^4$ J, and the number of iterations required to iterate to the optimal solution is 259 generations.

Figure 4B:
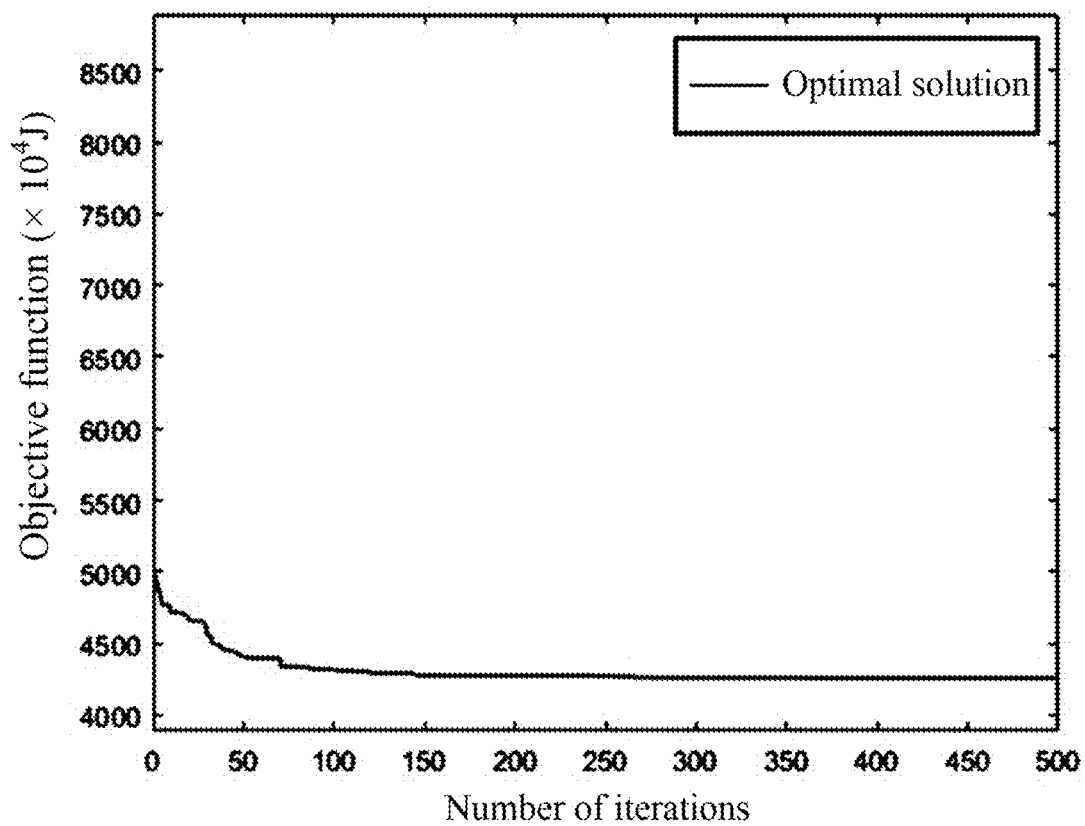
FIG. 4B is a diagram illustrating a result of operations of using a simulated annealing algorithm, using the operating parameters of multiple devices in a target system as population individuals, and processing the operating parameters of the multiple devices according to an embodiment of the present application.

FIG. 4B is a diagram illustrating a result of operations of using a simulated annealing algorithm, using the operating parameters of multiple devices in a target system as population individuals, and processing the operating parameters of the multiple devices according to an embodiment of the present application.

As shown in FIG. 4B, in the process of simulated algorithm processing, the algorithm operating duration is 460.8 s, the obtained final resource loss is $4287.54 \times 10^4$ J, and the number of iterations required to iterate to the optimal solution is 278 generations.

Figure 4C:
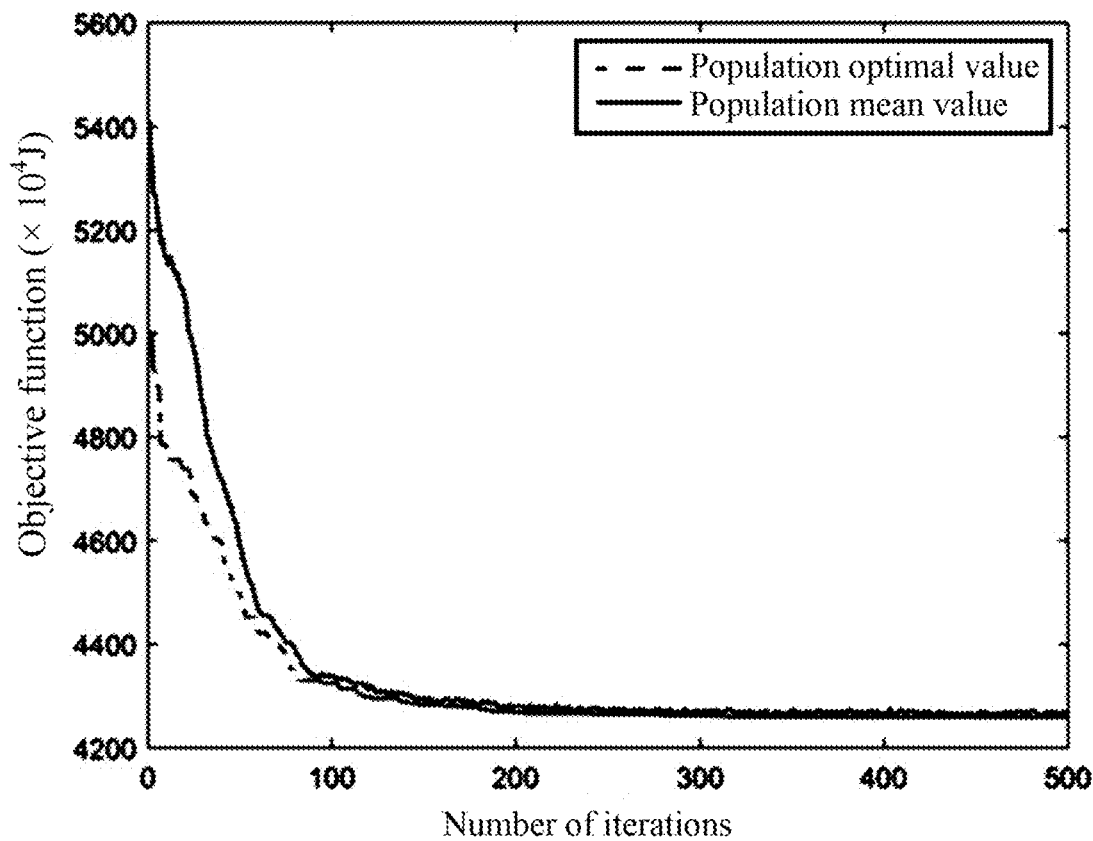
FIG. 4C is a diagram illustrating a result of operations of using a genetic-simulated annealing algorithm, using the operating parameters of multiple devices in a target system as population individuals, and processing the operating parameters of the multiple devices according to an embodiment of the present application.

FIG. 4C is a diagram illustrating a result of operations of using a genetic-simulated annealing algorithm, using the operating parameters of multiple devices in a target system as population individuals, and processing the operating parameters of the multiple devices according to an embodiment of the present application.

As shown in FIG. 4C, in the process of genetic-simulated algorithm processing, the algorithm operating duration is 425.6 s, the obtained final resource loss is $4243.54 \times 04^4$ J, and the number of iterations required to iterate to the optimal solution is 235 generations.

According to this embodiment of the present application, the genetic algorithm, the simulated annealing algorithm, and the genetic-simulated annealing algorithm are executed multiple times based on the same model parameter, and the obtained comparison result is shown in Table 1 and Table 2.

TABLE 1

Comparison results of average resource loss of the execution of different optimization algorithms for five times

| Optimization Algorithm | Average Resource Loss ($\times 10^4$ J) |
| --- | --- |
| No Optimization Algorithm | 4768.14 |
| Genetic Algorithm | 4266.94 |
| Simulated Annealing Algorithm | 4279.65 |
| Genetic-simulated Annealing Algorithm | 4235.72 |

According to this embodiment of the present application, it can be seen from Table 1 that the average resource loss obtained based on the genetic-simulated annealing algorithm is lower than the average resource loss obtained based on other algorithms. It indicates that the genetic-simulated annealing algorithm is used for solving the energy efficiency optimization function constructed in the present application, and the obtained device operating parameter can effectively reduce the resource loss of the integrated energy system.

TABLE 2

Comparison result of average energy efficiency of the execution of different optimization algorithms for five times

| Optimization Algorithm | Average Integrated Energy Efficiency (%) | Energy Efficiency of Independent operation of a Thermal Subsystem (%) |
| --- | --- | --- |
| No Optimization Algorithm | 73.02 | 63.36 |
| Genetic Algorithm | 74.02 | 64.08 |
| Simulated Annealing Algorithm | 74.11 | 64.24 |
| Simulated Annealing Algorithm | 75.34 | 65.53 |

According to this embodiment of the present application, it can be seen from Table 2 that the average resource loss obtained based on the genetic-simulated annealing algorithm is higher than the average resource loss obtained based on other algorithms. It indicates that the genetic-simulated annealing algorithm is used for solving the energy efficiency optimization function constructed in the present application, and the obtained device operating parameter can effectively improve the energy efficiency of the integrated energy system.

Based on the preceding method for optimizing system energy efficiency based on integrated energy, the present application also provides an apparatus for optimizing system energy efficiency based on an integrated energy requirement. The apparatus may be described below in conjunction with FIG. 5.

Figure 5:
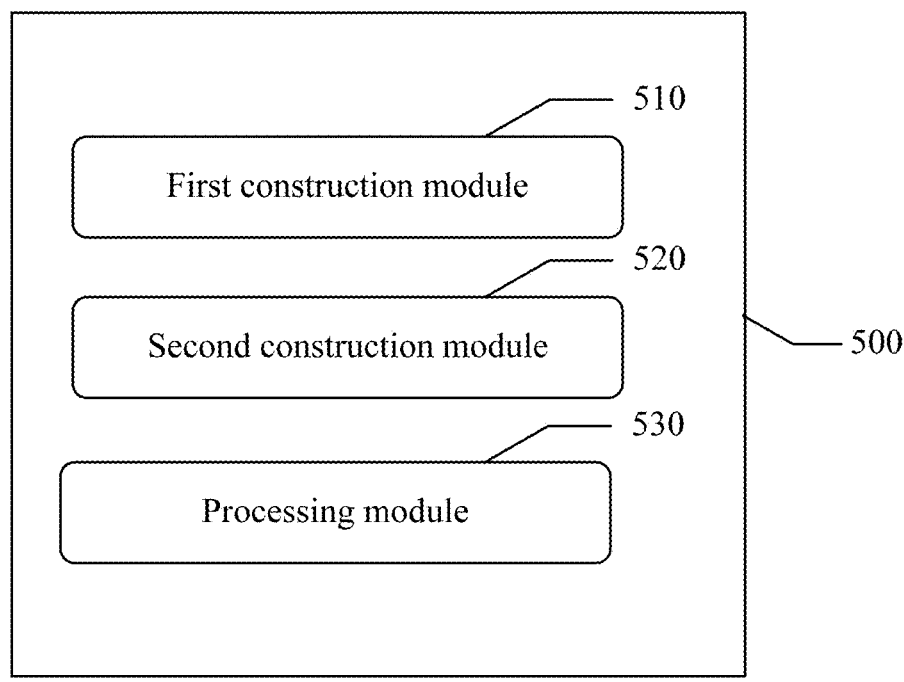
FIG. 5 is a block diagram of an apparatus for optimizing system energy efficiency based on an integrated energy requirement according to an embodiment of the present application.

FIG. 5 is a block diagram of an apparatus for optimizing system energy efficiency based on an integrated energy requirement according to an embodiment of the present application.

As shown in FIG. 5, the apparatus for optimizing system energy efficiency 500 based on an integrated energy requirement of this embodiment includes a first construction module 510, a second construction module 520, and a processing module 530.

The first construction module 510 is configured to, in response to the received target integrated energy requirement, construct the energy efficiency optimization function of the target system according to the integrated energy requirement parameter, the operating parameter of the target system, and the environment loss parameter of the target system. In this embodiment, the first construction module 510 may be configured to perform the operation S210 described above, and the details are not repeated here.

The second construction module 520 is configured to construct the constraint condition for optimizing the energy efficiency of the target system based on the balance relationship between the energy supply and the energy consumption and the device operating requirement for transmitting the energy. In an embodiment, the second construction module 520 may be configured to perform the operation S220 described above, and the details are not repeated here.

The processing module 530 is configured to, based on the energy efficiency optimization function and the constraint condition, use the target algorithm, use the operating parameters of multiple devices in the target system as the population individuals, and process the operating parameters of the multiple devices to obtain the device parameter of the target system that satisfies the target integrated energy requirement. In an embodiment, the processing module 530 may be configured to perform the operation S230 described above, and the details are not repeated here.

According to this embodiment of the present application, the integrated energy requirement parameter includes an actual terminal load parameter, the adjustment parameter of the terminal load, and an estimated terminal load parameter. The first construction module 510 includes a first construction sub-module and a second construction sub-module. The first construction sub-module is configured to construct the first function used for representing the energy usage status according to the estimated terminal load parameter and the actual terminal load parameter. The first construction sub-module is configured to construct the second function used for representing the energy conversion status according to the adjustment parameter of the terminal load, the operating parameter of the target system, and the environmental loss parameter of the target system.

According to this embodiment of the present application, the operating parameter of the target system includes an operating duration parameter, an operating energy consumption coefficient, a device quantity parameter, a device operating efficiency parameter, a device operating state parameter, a device operating energy consumption parameter, and a device operating power parameter. The second construction sub-module includes a first construction unit, a second construction unit, a third construction unit, a fourth construction unit, and a fifth construction unit. The first construction unit is configured to construct the first sub-function used for representing the energy loss according to the operating duration parameter, the operating energy consumption coefficient, the device quantity parameter, the device operating efficiency parameter, and the device operating energy consumption parameter. The second construction unit is configured to construct the second sub-function used for representing the device operating loss according to the device operating efficiency parameter. The third construction unit is configured to construct the third sub-function used for representing the requirement response subsidy according to the adjustment parameter of the terminal load. The fourth construction unit is configured to construct the fourth sub-function used for representing the device depreciation loss according to the device quantity parameter, the device operating state parameter, and the device operating power parameter. The fifth construction unit is configured to construct the fifth sub-function used for representing the environment resource loss during the pollutant emission treatment process of the target system according to the environmental loss parameter of the target system.

According to this embodiment of the present application, the adjustment parameter of the terminal load includes a transferable load parameter, an adjustable load parameter, and a reducible load parameter. The third construction unit includes a first construction sub-unit configured to construct the third sub-function according to the transferable load parameter, the adjustable load parameter, and the reducible load parameter.

According to this embodiment of the present application, the environmental loss parameter includes a pollutant type parameter, a pollutant emission coefficient, and the resource treatment loss parameter corresponding to the pollutant type parameter. The fifth construction unit includes a second construction sub-unit configured to construct the fifth sub-function according to the pollutant type parameter, the pollutant emission coefficient, and the resource treatment loss parameter corresponding to the pollutant type parameter.

According to this embodiment of the present application, the second construction module 520 includes a third construction sub-module and a fourth construction sub-module. The third construction sub-module is configured to, based on the balance relationship between the energy supply and the energy consumption, construct the first constraint condition according to the estimated terminal load parameter, the actual terminal load parameter, and the device operating energy consumption parameter of the target system. The fourth construction sub-module is configured to, based on the device operating requirement for transmitting the energy, construct the second constraint condition according to the device operating state parameter and the device operating power parameter.

According to this embodiment of the present application, the processing module 530 includes a fifth construction sub-module, a processing sub-module, a determination sub-module, a generation sub-module, and an acquisition sub-module. The fifth construction sub-module is configured to, based on the energy efficiency optimization function and the constraint condition, use the target algorithm, use the operating parameters of multiple devices in the target system as the population individuals to construct the initial population. The processing sub-module is configured to process the population individual in the initial population according to the predetermined fitness function to obtain multiple fitness degrees corresponding to multiple population individuals. The determination sub-module is configured to determine the target population individual from the initial population based on the multiple fitness degrees. The generation sub-module is configured to perform the genetic operation on the target population individual based on predetermined genetic probability to generate the offspring population. The obtainment sub-module is configured to, in the case where the fitness degree of the offspring population and the fitness degree of the initial population are determined to satisfy the predetermined condition, perform the annealing operation on the offspring population to obtain the device parameter of the target system.

According to this embodiment of the present application, the generation sub-module includes a crossover unit and a mutation unit. The crossover unit is configured to perform the crossover operation on the target population individual based on the predetermined crossover probability to obtain the crossover offspring population. The mutation unit is configured to perform the mutation operation on the crossover offspring population based on the predetermined mutation probability to obtain the offspring population.

According to this embodiment of the present application, the number of neighborhoods corresponding to the offspring population is I, and I is an integer greater than 1. The obtainment sub-module includes a first processing unit, a second processing unit, and a determination unit. The first processing unit is configured to use the neighborhood operator to process the population individual in the i-th neighborhood corresponding to the offspring population to obtain the first function value corresponding to the population individual in the i-th neighborhood for representing the energy usage status and the second function value corresponding to the population individual in the i-th neighborhood for representing the energy conversion status. The second processing unit is configured to, in the case where the current iteration round is determined not to satisfy the iteration termination condition, return to perform the processing operation on the i-th neighborhood and increase i. The determination unit is configured to, in the case where the current iteration round is determined to satisfy the iteration termination condition, determine the attribute parameter of the population individual in the neighborhood corresponding to the maximum first function value and the attribute parameter of the population individual in the neighborhood corresponding to the minimum second function value as the device parameter of the target system.

According to the embodiments of the present application, any multiple modules in the first construction module 510, the second construction module 520, and the processing module 530 may be combined into one module for implementation, or any one of the modules may be split into multiple modules. Alternatively, at least part of the functions of one or more modules in these modules may be combined with at least part of the functions of other modules and implemented in one module. According to this embodiment of the present application, at least one of the first construction module 510, the second construction module 520, or the processing module 530 may be at least partially implemented as a hardware circuit, such as a field-programmable gate array (FPGA), a programmable logic array (PLA), a system on a chip, a system on a substrate, a system on a package, and an application-specific integrated circuit (ASIC), or may be implemented by hardware or firmware, such as any other reasonable manner of integrating or packaging the circuit, or may be implemented in any one of three implementation methods of software, hardware, and firmware, or in any appropriate combination of any of them. Alternatively, at least one of the first construction module 510, the second construction module 520, or the processing module 530 may be at least partially implemented as a computer program module. When the computer program module is executed, the corresponding function may be performed.

Figure 6:
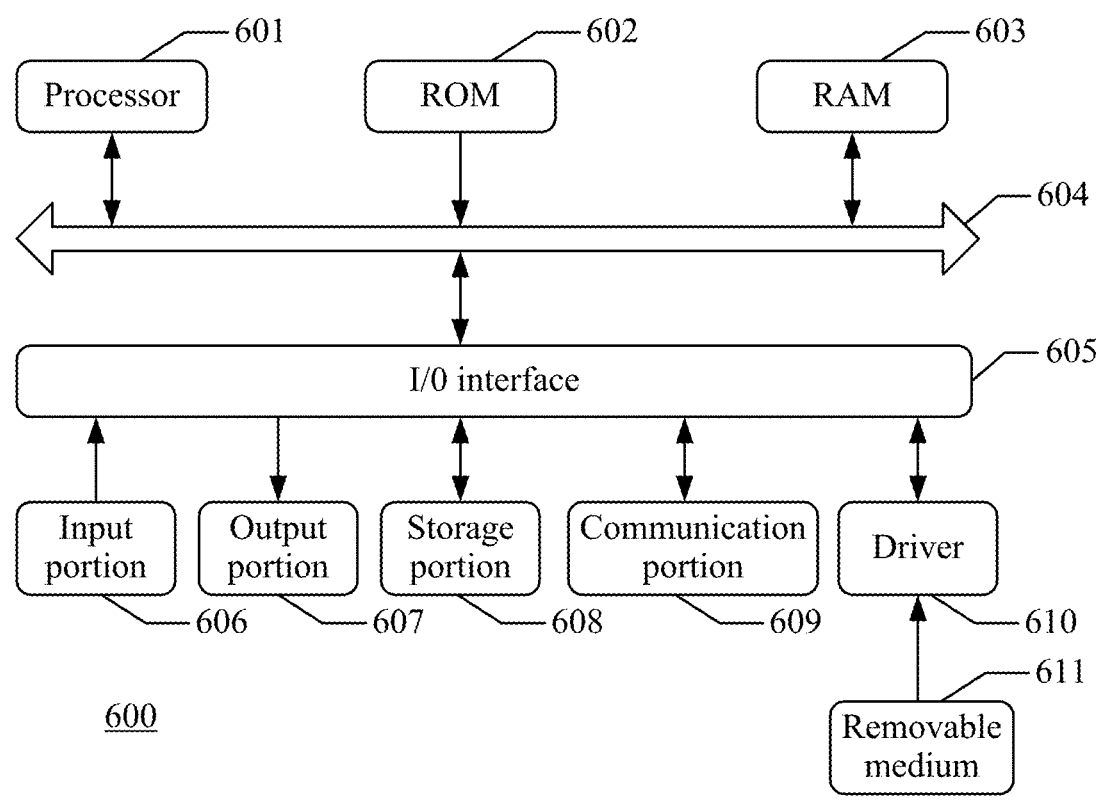
FIG. 6 is a block diagram of an electronic device suitable for implementing a method for optimizing system energy efficiency based on an integrated energy requirement according to an embodiment of the present application.

FIG. 6 is a block diagram of an electronic device suitable for implementing a method for optimizing system energy efficiency based on an integrated energy requirement according to an embodiment of the present application.

As shown in FIG. 6, the electronic device 600 according to this embodiment of the present application includes a processor 601. The electronic device 600 may perform various types of appropriate actions and processing according to a program stored in a read-only memory (ROM) 602 or a program loaded from a storage portion 608 to a random-access memory (RAM) 603. The processor 601 may include, for example, a general-purpose microprocessor (for example, a CPU), an instruction set processor and/or a related chip set and/or a dedicated microprocessor (for example, an ASIC). The processor 601 may also include an onboard memory configured for cache purposes. The processor 601 may include a single processing unit or multiple processing units for executing different actions of the method flow according to the embodiments of the present application.

The RAM 603 stores various programs and data required for the operation of the electronic device 600. The processor 601, the ROM 602, and the RAM 603 are connected to each other through a bus 604. The processor 601 performs various operations of the method flow according to the embodiments of the present application by executing the program in the ROM 602 and/or the RAM 603. The program may also be stored in one or more memories other than the ROM 602 and the RAM 603. The processor 601 may also perform various operations of the method flow according to the embodiments of the present application by executing programs stored in the one or more memories.

According to the embodiment of the present applications, the electronic device 600 may also include an input/output (I/O) interface 605, and the I/O interface 605 is also connected to the bus 604. The electronic device 600 may also include one or more of the following components connected to the I/O interface 605: an input portion 606 including a keyboard and a mouse; an output portion 607 including a cathode ray tube (CRT), a liquid crystal display (LCD), and a speaker; a storage portion 608 including a hard disk; and a communication portion 609 including a network interface card such as a local area network (LAN) card and a modem. The communication portion 609 performs communication processing through a network such as the Internet. A driver 610 is also connected to the I/O interface 605 as needed. A removable medium 611, such as a magnetic disk, an optical disk, a magneto-optical disk, and a semiconductor memory, is mounted on the driver 610 as needed, so that the computer program read therefrom is mounted into the storage portion 608 as needed.

The present application also provides a computer-readable storage medium. The computer-readable storage medium may be included in the device/apparatus/system described in the preceding embodiments or may exist independently without being assembled into the device/apparatus/system. The preceding computer-readable storage medium carries one or more programs. When the one or more programs are executed, the method according to the embodiments of the present application is implemented.

According to an embodiment of the present application, the computer-readable storage medium may be a non-volatile computer-readable storage medium, such as a portable computer magnetic disk, a hard disk, a RAM, a ROM, an electrically erasable programmable read-only memory (EPROM), a flash memory, a portable compact disc read-only memory (CD-ROM), an optical storage device, a magnetic storage device, or any suitable combination thereof. In the present application, the computer-readable storage medium may be any tangible medium including or storing a program. The program may be used by or used in conjunction with an instruction execution system, apparatus, or device. For example, according to an embodiment of the present application, the computer-readable storage medium may include the ROM 602 and/or the RAM 603 described above and/or one or more memories other than the ROM 602 and the RAM 603. The storage medium may be a non-transitory storage medium.

An embodiment of the present application includes a computer program product. The computer program product includes a computer program. The computer program includes program codes for performing the methods shown in the flowcharts. When the computer program product operates in a computer system, the program codes are used to enable the computer system to implement the item recommendation method provided in the embodiments of the present application.

When the computer program is executed by the processor 601, the preceding functions defined in the system/apparatus of the embodiments of the present application are executed. According to the embodiments of the present application, the system, apparatus, modules, and units described above may be implemented by computer program modules.

In an embodiment, the computer program may rely on a tangible storage medium such as an optical storage device or a magnetic storage device. In another embodiment, the computer program may also be transmitted and distributed in the form of a signal on a network medium, and downloaded and mounted through the communication portion 609, and/or mounted from the removable medium 611. Program codes included in the computer medium may be transmitted through any suitable network medium. The medium includes a wireless medium, a wired medium, or any appropriate combination thereof.

In such an embodiment, the computer program may be downloaded and mounted from a network through the communication portion 609 and/or mounted from the removable medium 611. When the computer program is executed by the processor 601, the preceding functions defined in the system of the embodiments of the present application are executed. According to the embodiments of the present application, the system, device, apparatus, modules, and units described above may be implemented by computer program modules.

According to the embodiments of the present application, the computer program codes of the computer program for performing the operations of the embodiments of the present application may be written in any combination of one or more programming languages. These computing programs may be implemented in a high-level procedural and/or object-oriented programming language and/or in an assembly/machine language. The programming languages include programming languages such as Java, C++, python, and "C" language. The program codes may be executed entirely on a user computing device, executed partly on a user device, executed partly on a remote computing device, or executed entirely on a remote computing device or a server. In the case relating to the remote computing device, the remote computing device may be connected to a user computing device through any type of network including a LAN or a wide area network (WAN) or may be connected to an external computing device (for example, through the Internet through an Internet service provider).

The flowcharts and block diagrams in the drawings illustrate possible architectures, functions and operations of the system, method and computer program product according to the embodiments of the present application. In this regard, each block in the flowcharts or block diagrams may represent a module, a program segment, or part of codes. The module, program segment, or part of codes contains one or more executable instructions for implementing specified logical functions. In some alternative implementations, the functions noted in the blocks may occur in an order different from that noted in the drawings. For example, two successive blocks may, in practice, be executed substantially in parallel or executed in a reverse order, which depends on the functions involved. Each block in the block diagrams and flowcharts and a combination of blocks in the block diagrams or flowcharts may be implemented by a specific-purpose hardware-based system which performs specified functions or operations or a combination of specific-purpose hardware and computer instructions.

Features described in multiple embodiments and/or claims of the present application may be combined or/and coupled in various ways, even if such combinations or couplings are not explicitly described in the present application. Features described in multiple embodiments and/or claims of the present application may be combined and/or coupled in various ways. All the combinations and/or couplings fall within the scope of the present application.

What is claimed is:

1. A method for optimizing system energy efficiency based on an integrated energy requirement, applying to an integrated energy requirement response terminal device, comprising:

receiving a target integrated energy requirement transmitted by a load management system main station on a grid side;

in response to the received target integrated energy requirement, constructing an energy efficiency optimization function of a target system according to an integrated energy requirement parameter, an operating parameter of the target system, and an environmental loss parameter of the target system;

constructing a constraint condition for optimizing energy efficiency of the target system based on a balance relationship between energy supply and energy consumption and a device operating requirement for transmitting energy; and based on the energy efficiency optimization function and the constraint condition, using a target algorithm, configuring operating parameters of a plurality of devices in the target system as population individuals, and processing the operating parameters of the plurality of devices to obtain a device parameter of the target system that satisfies the target integrated energy requirement;

generating responding instructions according to the device parameter of the target system, and sending the response instructions to the integrated energy system, wherein the device parameter in the response instructions is used by the integrated energy system to adjust a device parameter of a corresponding device;

wherein the energy efficiency optimization function is as follows:

$$\max \eta_{IES} = \frac{L_e + L_h \lambda_h}{W_e + W_g \lambda_g}, \quad (1)$$

wherein $W_e$ denotes total electrical energy pre-purchased at a user side, $W_g$ denotes total natural gas pre-purchased at the user side, $L_e$ denotes total electric load at the user side, $L_h$ denotes total thermal load at the user side, $\lambda_h$ denotes an energy quality coefficient of a total thermal load and the natural gas, and $\lambda_g$ denotes an energy quality coefficient of the electric load and the electrical energy; and $$\min C = C_1 + C_2 + C_3 + C_4 + C_5 \quad (2),$$

wherein $$C_1 = \sum_{t=1}^{T}\left(\sum_{i=1}^{N}\left(\frac{c_{g(t)}g_n}{\eta i}\right) + W_e(t)c_e(t)\right), \quad (2\text{-}1)$$

wherein $c_g(t)$ denotes an energy consumption value of electric energy in a period t, $c_e(t)$ denotes an energy consumption value of natural gas in the period t, T denotes total operating duration of an integrated energy system, N denotes a total number of devices in the integrated energy system, $\eta_i$ denotes operating efficiency of an i-th device of the devices, $g_n$ denotes usage amount of natural gas of the i-th device in an operating stage per unit time, and $W_e(t)$ denotes usage amount of the electrical energy in the period t:

$$C_2 = \sum_{t=1}^{T}\sum_{i=1}^{N}[c_{r,i}P_i(t)], \quad (2\text{-}2)$$

wherein $c_{r,i}$ denotes unit operating loss of the i-th device, and $P_i(t)$ denotes output power of the i-th device in the period t:

$$C_3 = \sum_{t=1}^{T}(c_{TL}E_{TL}(t) + c_{RL}E_{RL}(t) + c_{AL}E_{AL}(t)), \quad (2\text{-}3)$$

wherein $c_{TL}$ denotes a unit compensation parameter of transferable load, $c_{RL}$ denotes a unit compensation parameter of reducible load, $c_{AL}$ denotes a unit compensation parameter of adjustable thermal load, $E_{TL}(t)$ denotes total amount of actual transfer of transferable load in the period t, $E_{RL}(t)$ denotes total amount of actual reduction of reducible load in the period t, and $H_{AL}(t)$ denotes total amount of actual variation of adjustable thermal load in the period t;

$$C_4 = \sum_{t=1}^{T}\sum_{i=1}^{N}\left[\frac{c_{inv,i}\lambda_r}{P_{m,i}t_{m,i}}P_i(t)\right], \quad (2\text{-}4)$$

wherein $c_{inv,i}$ denotes full usage loss of the i-th device, $\lambda_r$ denotes a device recovery coefficient, $P_{m,i}$ denotes rated power of the i-th device, $t_{m,i}$ denotes maximum usable duration of the i-th device, and $P_i(t)$ denotes the output power of the i-th device in the period t; and $$C_5 = \sum_{p=1}^{P} c_p \left(\sum_{t=1}^{T}\sum_{i=1}^{N} P_i(t)\eta_r\right), \quad (2\text{-}5)$$

wherein $c_P$ denotes treatment loss of a p-th pollutant, P denotes a total number of pollutant types, and $\eta_r$ denotes an emission coefficient of a pollutant;
the constraint condition is as follows:

$$\begin{cases} \sum_{t=1}^{T} W_e(t) = \sum_{t=1}^{T}(W_{el}(t) + W_{ed}(t)) \\ \sum_{t=1}^{T}\sum_{i=1}^{N} W_g(t)\eta_i = \sum_{t=1}^{T}(W_{hl}(t) + W_{hd}(t)) \end{cases}, \quad (3)$$

wherein $W_{el}(t)$ denotes an electric load requirement at the user side in the period t, $W_{ed}(t)$ denotes electricity consumption of an electric drive device in the integrated energy system in the period t, $W_{hl}(t)$ denotes a thermal load requirement at the user side in the period t, and $W_{hd}(t)$ denotes thermal consumption of a thermal drive device in the integrated energy system in the period t; and $$\begin{cases} P_{min}(t)\theta(t) \le P_i(t) \le P_{max}(t)\theta(t) \\ \Delta P_{min}(t)\theta(t) \le \Delta P_i(t) \le \Delta P_{max}(t)\theta(t) \\ \theta(t) = 1 \text{ on} \\ \theta(t) = 0 \text{ off} \end{cases}, \quad (4)$$

wherein $P_{min}$ denotes a lower limit of output power of a device of the integrated energy system, $P_{max}$ denotes an upper limit of the output power of the device of the integrated energy system, $\Delta P_{min}$ denotes a lower limit of a climbing rate of the device of the integrated energy system, $\Delta P_{max}$ denotes an upper limit of the climbing rate of the device of the integrated energy system, $\theta(t)$ denotes a start or stop state of the device, $\theta(t)=1$ denotes that the device is turned on, and $\theta(t)=0$ denotes that the device is turned off; and
the target algorithm comprises any one of: a genetic algorithm, a simulated annealing algorithm, or a genetic-simulated annealing algorithm.

2. The method according to claim 1, wherein the integrated energy requirement parameter comprises an actual terminal load parameter, an adjustment parameter of terminal load, and an estimated terminal load parameter; and
the constructing the energy efficiency optimization function of the target system according to the integrated energy requirement parameter, the operating parameter of the target system, and the environmental loss parameter of the target system comprises:
constructing a first function used for representing energy usage status according to the estimated terminal load parameter and the actual terminal load parameter; and
constructing a second function used for representing energy conversion status according to the adjustment parameter of the terminal load, the operating parameter of the target system, and the environmental loss parameter of the target system.

3. The method according to claim 2, wherein the operating parameter of the target system comprises an operating duration parameter, an operating energy consumption coefficient, a device quantity parameter, a device operating efficiency parameter, a device operating state parameter, a device operating energy consumption parameter, and a device operating power parameter; and
constructing the second function used for representing the energy conversion status according to the adjustment parameter of the terminal load, the operating parameter of the target system, and the environmental loss parameter of the target system comprises:
constructing a first sub-function used for representing energy loss according to the operating duration parameter, the operating energy consumption coefficient, the device quantity parameter, the device operating efficiency parameter, and the device operating energy consumption parameter;
constructing a second sub-function used for representing device operating loss according to the device operating efficiency parameter;
constructing a third sub-function used for representing a requirement response subsidy according to the adjustment parameter of the terminal load;
constructing a fourth sub-function used for representing device depreciation loss according to the device quantity parameter, the device operating state parameter, and the device operating power parameter; and
constructing a fifth sub-function used for representing environmental resource loss during a pollutant emission treatment process of the target system according to the environmental loss parameter of the target system.

4. The method according to claim 3, wherein the adjustment parameter of the terminal load comprises a transferable load parameter, an adjustable load parameter, and a reducible load parameter; and
constructing the third sub-function used for representing the requirement response subsidy according to the adjustment parameter of the terminal load comprises:
constructing the third sub-function according to the transferable load parameter, the adjustable load parameter, and the reducible load parameter.

5. The method according to claim 3, wherein the environmental loss parameter comprises a pollutant type parameter, a pollutant emission coefficient, and a resource treatment loss parameter corresponding to the pollutant type parameter; and
constructing the fifth sub-function used for representing the environmental resource loss during the pollutant emission treatment process of the target system according to the environmental loss parameter of the target system comprises:
constructing the fifth sub-function according to the pollutant type parameter, the pollutant emission coefficient, and the resource treatment loss parameter corresponding to the pollutant type parameter.

6. The method according to claim 1, wherein constructing the constraint condition for optimizing the energy efficiency of the target system based on the balance relationship between the energy supply and the energy consumption and the device operating requirement for transmitting the energy comprises:
constructing a first constraint condition according to an estimated terminal load parameter, the actual terminal load parameter, and the device operating energy consumption parameter of the target system; and
based on the device operating requirement for transmitting the energy, constructing a second constraint condition according to the device operating state parameter and the device operating power parameter.

7. The method according to claim 1, wherein based on the energy efficiency optimization function and the constraint condition, using the target algorithm, using the operating parameters of the plurality of devices in the target system as the population individuals, and processing the operating parameters of the plurality of devices to obtain the device parameter of the target system that satisfies the target integrated energy requirement comprise:
based on the energy efficiency optimization function and the constraint condition, using the target algorithm and using the operating parameters of the plurality of devices in the target system as the population individuals to construct an initial population;
processing a population individual in the initial population according to a predetermined fitness function to obtain a plurality of fitness degrees corresponding to a plurality of population individuals;
determining a target population individual from the initial population based on the plurality of fitness degrees;
performing a genetic operation on the target population individual based on predetermined genetic probability to generate an offspring population; and
in a case where the fitness degree of the offspring population and the fitness degree of the initial population are determined to satisfy a predetermined condition, performing an annealing operation on the offspring population to obtain the device parameter of the target system.

8. The method according to claim 7, wherein the performing the genetic operation on the target population individual based on the predetermined genetic probability to generate the offspring population comprises:
performing a crossover operation on the target population individual based on predetermined crossover probability to obtain a crossover offspring population; and
performing a mutation operation on the crossover offspring population based on predetermined mutation probability to obtain the offspring population.

9. The method according to claim 7, wherein the number of neighborhoods corresponding to the offspring population is I, and/is an integer greater than 1; and
the performing the annealing operation on the offspring population to obtain the device parameter of the target system comprises:
using a neighborhood operator to process a population individual in a j-th neighborhood corresponding to the offspring population to obtain a first function value corresponding to the population individual in the j-th neighborhood for representing energy usage status and a second function value corresponding to the population individual in the j-th neighborhood for representing energy conversion status;
in a case where a current iteration round is determined not to satisfy an iteration termination condition, returning to perform a processing operation on the j-th neighborhood and increasing j; and
in a case where the current iteration round is determined to satisfy the iteration termination condition, determining an attribute parameter of a population individual in a neighborhood corresponding to a maximum first function value and an attribute parameter of a population individual in a neighborhood corresponding to a minimum second function value as the device parameter of the target system.

10. An electronic device, comprising: one or more processors; and a memory configured to store one or more programs, wherein when executing the one or more programs, the one or more processors perform the method according to claim 1.

11. A non-transitory computer-readable storage medium, storing executable instructions, wherein when executing the executable instructions, a processor performs the method according to claim 1.

* * * * *